United States Patent [19]

Ginn

[11] Patent Number: 4,942,727
[45] Date of Patent: Jul. 24, 1990

[54] SEED COLLECTOR DEVICE FOR A MOWER

[76] Inventor: William D. Ginn, 15188 Princeton Rd., Cerulean, Ky. 42215

[21] Appl. No.: 425,118

[22] Filed: Oct. 23, 1989

[51] Int. Cl.$^5$ .............................................. A01D 45/30
[52] U.S. Cl. ......................................... 56/126; 56/207
[58] Field of Search ................................ 56/126–130, 56/202–207, 322, 324

[56] References Cited

U.S. PATENT DOCUMENTS

| | | | |
|---|---|---|---|
| 1,233,984 | 7/1917 | Cole | 56/207 |
| 1,688,969 | 10/1928 | Jones | 56/207 |
| 2,134,239 | 10/1938 | Sells | 56/207 |
| 2,152,548 | 3/1939 | Jones | 56/207 |
| 4,587,799 | 5/1986 | Thomas et al. | 56/126 X |
| 4,738,087 | 4/1988 | Lundahl | 56/126 X |

Primary Examiner—Thuy M. Bui
Attorney, Agent, or Firm—Harrington A. Lackey

[57] ABSTRACT

A seed collector device for a mower apparatus having an elongatged cutter blade, including a seed collection tray having an elongated transverse front edge mounted above the cutter blade and declining rearward in order to collect seed from the seed heads of the vegetation encountered by the front edge of the tray and the cutter blade, causing the seeds to drop upon the tray, and a transverse declining trough at the rear end of the tray for routing the seeds from the tray to a receptacle below the discharge end of the trough.

11 Claims, 1 Drawing Sheet

SEED COLLECTOR DEVICE FOR A MOWER

Background of the Invention

This invention relates to a seed collector device for a mower and more particularly to a device for collecting seed from the seed heads of the vegetation as it is cut by the mower.

Heretofore, as a mower apparatus including an elongated cutter blade device extending transversely from behind the tractor, cuts tall vegetation, the seeds from the seed heads of the cut vegetation are indiscriminately scattered and lost. Some of the seed falls upon the mower including the mower housing, but most of the seed falls idly upon the ground, where some of it may be free to grow additional vegetation, but indiscriminately and uncontrolled.

U.S. Pat. No. 1,233,984 of N. S. Cole, issued July 17, 1917 for "SEED SAVING ATTACHMENT FOR MOWERS" describes a device to collect seed from the seed head of vegetation as it is cut. The Cole attachment includes a receptacle which is slipped to the rear edge of the elongated transverse cutter bar. The top of the receptacle is covered by a hinged perforated cover 6 which declines forwardly and terminates on the rear of the cutter bar. When the shallow receptacle is filled with seed deposited through the perforations of the cover, the mower is stopped, the hinged cover is raised, and the receptacle removed and dumped. The Cole attachment relies upon the seeds falling upon the cover 6 as the stalks of the vegetation are cut close to the base of the vegetation or close to the ground. Moreover, the Cole device relies upon the seed gravitating forward, instead of rearward, for collection through the perforations. Furthermore, if the stalks are too long, the seed heads may fall behind the receptacle causing many of the seeds to be lost.

The Cole device is not provided with an elevated front edge of a forward moving cover or tray for impacting the stalks of the vegetation immediately below the seed heads to cause most of the seed to fall upon the tray.

Summary of the Invention

This invention relates to a seed collector device including a rearwardly declining collection tray mounted above a transversely extending, elongated cutter blade at an elevation slightly below the seed heads of the vegetation to be cut, in order to impact the stalks of the vegetation immediately below the seed heads to shake the seeds loose to drop upon the rearward declining tray.

A further object of this invention is to provide a seed collector tray mounted over the blade device of a mower apparatus, which tray declines rearwardly and terminates in an elongated transverse trough below the rear edge of the tray for conveying the seed collected by the tray to a receptacle at one end of the trough.

Another object of this invention is to provide a seed collector device for a mower apparatus having an elongated transversely extending cutter blade, including a rearward declining collection tray whose front transverse edge is preferably spaced in front of the cutter blade and at an elevation for impacting stalks of the vegetation immediately below the seed heads and in which the rear edge of the tray is behind and above the cutter blade and terminates in an integrally formed elongated trough declining transversely from one end of the tray to the other in order to discharge the collected seeds into a receptacle mounted below the lower end of the trough and adjacent one end of the tray.

Description of the Preferred Embodiment

Figure 1:
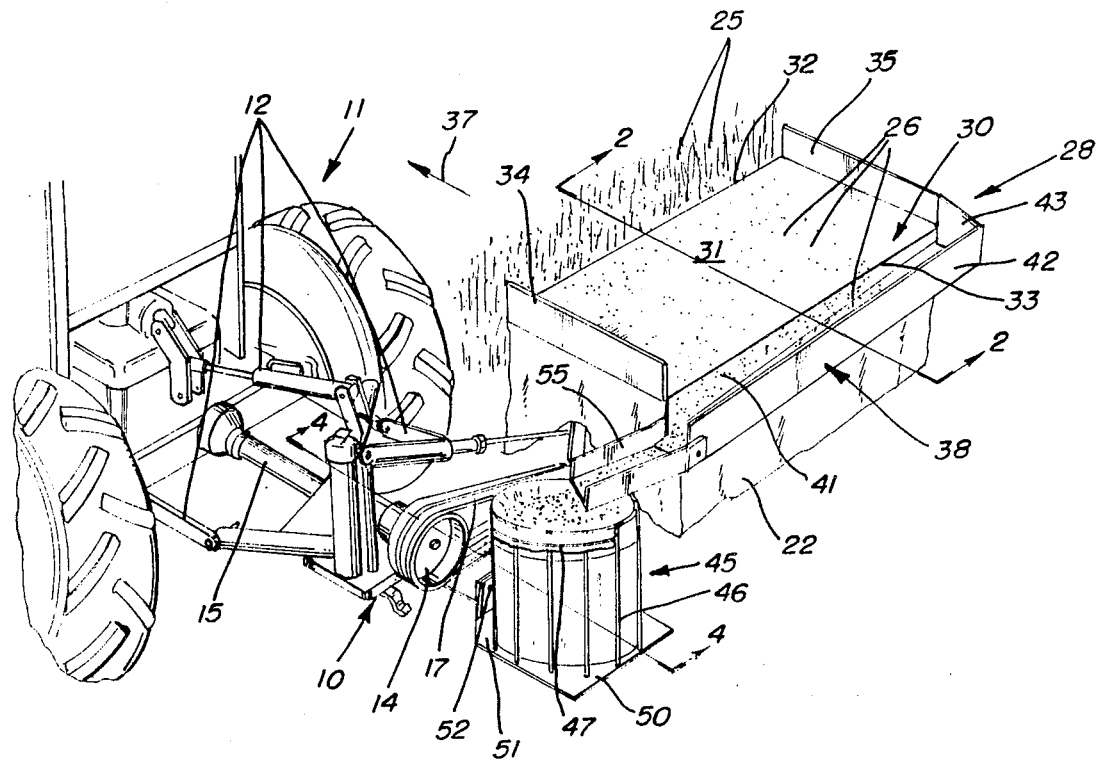
FIG. 1 is a top rear perspective view of the seed collector device made in accordance with this invention mounted upon a mower apparatus supported upon the rear end of a tractor, shown fragmentarily.

Referring now to the drawings in more detail, the mower apparatus 10 is mounted upon the rear end portion of a tractor 11 by a conventional 3-point hitch 12. The mower apparatus 10 includes a large pulley 14 driven by the power take-off 15 from the tractor 11. The drive pulley 14 is coupled to a driven pulley 16 (FIG. 4) by a belt 17, to drive a gear transmission 18, which, in turn, drives an elongated transverse cutter bar 20 supporting a plurality of rotary blades 21 The cutter bar of course could be a conventional reciprocating cutter bar, or any other type of conventional cutter bar.

Figures 2, 3:
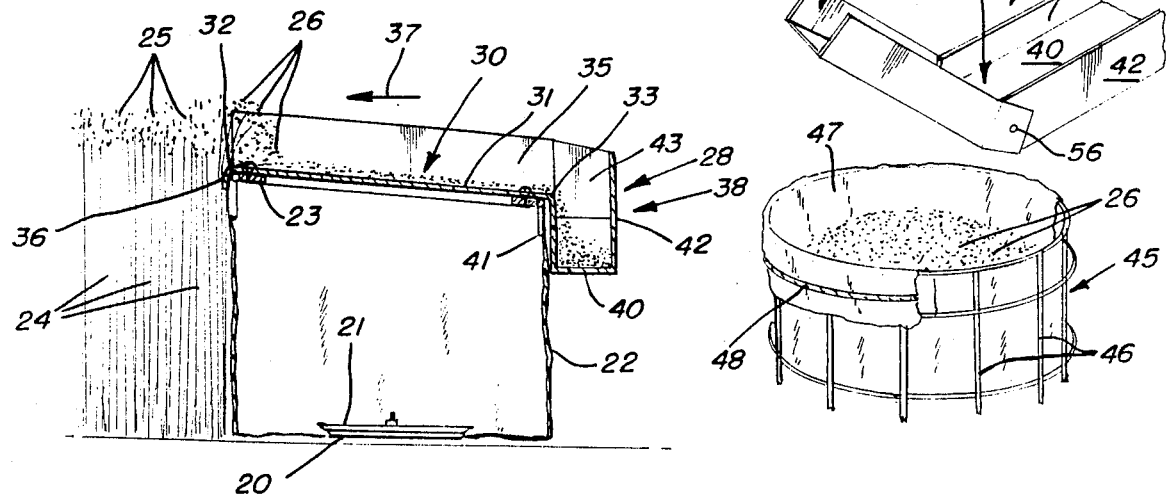
FIG. 2 is an enlarged sectional elevation, taken along the line 2—2 of FIG. 1.
FIG. 3 is an enlarged fragmentary, top, rear perspective view of the upper portion of the seed receptacle and the discharge end portion of the trough with its chute in an upper inoperative position.

The elongated cutter bar 20 is enclosed by a flexible plastic or fabric hood or cover 22, in a conventional manner. The hood or cover 22 may be supported by an elongated transverse frame 23 (FIG. 2).

When the tractor 11 is propelled forward, the mower apparatus 10, including the transversely extending cutter bar 20 and the hood 22, is likewise moved forwardly through a field of vegetation, preferably tall vegetation, such as grasses having vertical stalks 24 terminating in upper seed heads 25 incorporating clusters of seeds 26.

The elements and functions thus far described are well known in the art of mowing.

The seed collector device 28 made in accordance with this invention includes an elongated, preferably flat and planar, seed tray 30 having a top surface 31, preferably solid, an elongated front transverse edge 32, and an elongated rear transverse edge portion 33. The opposite ends of the tray 30 terminate in upstanding side walls 34 and 35, while the front edge 32 and the rear edge 33 are unobstructed, or flush with the top surface 30 to permit the free passage of seed 26 thereover.

It will be noted in FIG. 2, that the front edge 32 extends slightly forward of the front edges of the side walls 34 and 35 and projects downward to form an abutment or impact surface or lip 36. The front impact surface 36 engages the stalks 24 of the vegetation, as the tray 30 moves forward in the direction of the arrow 37 in order to impact or bump the stalks 24 and shake the seed heads 25 slightly to separate the seeds 26 and cause them to fall or drop upon the top surface 31 of the tray 30.

Mounted beneath a rear transverse edge portion 33 of the tray 30 is an elongated transversely extending trough 38, preferably extending the entire width of the tray 30. The trough 38 is preferably channel-shaped, having an elongated bottom wall 40 and a pair of opposed side walls 41 and 42 and an upper head wall 43 closing the upper end of the trough 38. As disclosed in the drawings, the trough 38 declines from its closed end 43 at one side of the tray 30 to and beyond the opposite end of the tray 30, terminating in a discharge opening 44.

In a preferred form of the invention, the front side wall 41 of the trough 38 is an integral part of the tray 30, depending vertically from the rear edge portion 33, as illustrated in the drawings.

Supported below the discharge end 44 of the trough 38 is seed collection container 45. The particular container 45 disclosed in the drawings includes a cylindrically-shaped wire frame 46 in which may be secured a disposable paper or plastic container or sack 47. If desired, the upper edge of the sack 47 may be turned downward over the top of the wire frame 46 and secured by an elastic band 48 (FIG. 3).

Figure 4:
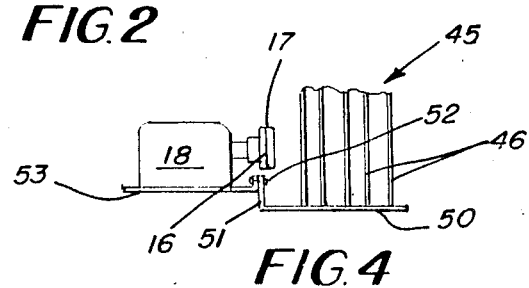
FIG. 4 is a fragmentary section taken along the line 4—4 of FIG. 1.

The bottom of the wire frame 46 is supported upon a receptacle base or plate 50 having a mounting edge portion 51 which is secured by bolts 52 to the frame 53 upon which the gear box or gear transmission device 18 is mounted, as best disclosed in FIG. 4.

Since the gear box 18 as well as the driven pulley 16 is connected rigidly to the cutter bar 20, and the cutter bar 20 is pivotally elevated, then the entire collector device 28 moves with the cutter bar, including the receptacle 45, the tray 30 and the trough 38, when pivoted.

If it is desired to locate the receptacle 45 in a position not immediately below the discharge opening 44 of the trough 38, such as illustrated in FIG. 1, then an elongated chute 55, preferably channel-shaped, as disclosed in FIGS. 1 and 3, is pivotally mounted at one end by the hinge pins 56 to the lower or discharge end portion 44 of the trough 38. The chute 55 will extend the effective length of the trough 38. Moreover, as illustrated in FIG. 1, the chute 55 diverges laterally forward from the longitudinal axis of the trough 38 in order to slightly change the direction of the flow of seeds 26 from the trough 38 to the receptacle 45.

As disclosed in FIG. 3, the chute 55 may be pivoted upward to an inoperative or closed position preventing further discharge of the seed 26 from the trough 48, to permit the sack or container 47 to be removed and emptied, and re-inserted into the wire frame 46, or replaced by another sack. The chute 55 may then be lowered to resume the discharge of any seed 26 in the trough 38 into the receptacle 45.

In the operation of the seed collector device 28 in conjunction with the mower apparatus 10, all of the elements are assembled as disclosed in FIGS. 1, 2, and 4, and the chute 55, if used, is lowered from its upper inoperative position disclosed in FIG. 3 to its lower discharge position disclosed in FIG. 1. The tractor 11 is then propelled forward through a field of vegetation including the stalks 24, in the longitudinal forward direction of the arrow 37. As the front lip 36 engages and impacts the stalks 24 just below the seed heads 25, the seed heads 25 are shaken causing the release of their seeds 26, most of which fall upon the tray 30 moving forward beneath the seeds 26. The stalks 24 are then cut by the moving cutter blades 21 causing further release of seeds 26 from the seed heads 25, most of which fall upon the top surface 31 of the seed collection tray 30.

The seed collection tray surface 31 declines rearwardly from its front edge 32 to its rear edge 33, as best illustrated in FIG. 2, thus causing the seeds 26 to naturally move or gravitate rearwardly along the top surface 31 until they fall over the rear transverse edge 33.

Because of the open rear edge portion 33 and the opposite end walls 34 and 35, all of the seeds 26 falling upon the tray surface 31 are confined to a path discharging over the rear edge 33 into the trough 38. Since the trough 38 declines from its right closed end toward the left, the seeds 26 within the trough 38 gravitate downwardly along the declining bottom wall 40 and also the declining chute 55 to fall from the discharge opening 57 of the chute 55 directly into an open-top container 47.

The operation of knocking the seeds 26 loose from their seed heads 25 and routing the seeds across the top declining surface 31 of the collection tray 30 and the declining trough 38 and chute 55 into the receptacle 45 continues until the receptacle 45 is nearly full. Then the tractor 11 is stopped and the chute 55 elevated as disclosed in FIG. 3. The retainer band 48 is removed from the wire frame 46 to permit the lifting of the full container 47. The container 47 may be stored as is, and replaced with an empty container 47, or the container 47 may be emptied and re-inserted into the receptacle frame 46. The operation is then repeated.

Although the front impact lip 36 of the front edge 32 is disclosed in front of the cutting blades 21, nevertheless, the lip 36 could be farther rearward, so long as the lip 36 is not behind the cutting blades 21. If the stalks 24 are first cut before they are impacted by the transverse lip 36, some of the stalks may fall forward so that the benefit of impacting the stalks 24 and shaking the seed heads 25 to discharge the seed 26 upon the top of the tray 30 may be lost.

As disclosed in the drawings, the entire collection tray and the trough 38 may be integrally formed from a single piece of sheet material, such as sheet metal. Moreover, because of the unitary single sheet material, there is a smooth continuous surface from the front edge 32 rearward to the bottom wall 40 over which the seeds 26 may slide or flow with a minimum of friction and without any cracks or crevices which might catch some of the seed.

What is claimed is:

1. A seed collector device for a mower apparatus adapted to move in a longitudinal direction, having a blade device extending transversely of the longitudinal direction and adapted to cut the stalks of vegetation having heads of seed above the blade device, comprising:
    (a) a seed collection tray having a longitudinal dimension and a transverse dimension, a top surface, a front transverse edge, a rear transverse edge portion, and opposite ends;
    (b) support means mounting said tray above said blade device, said front transverse edge being at an elevation below the seed heads of the vegetation to be cut by said blade device, to engage said stalk as said tray moves forward to cause the seed from the seed heads to fall upon said top surface,
    (c) said top surface declining from said front transverse edge toward said rear edge portion, and
    (d) collector means for receiving seed moving downward and rearward over said top surface.

2. The invention according to claim 1 in which said front transverse edge is spaced in front of said blade device.

3. The invention according to claim 1 in which said collector means comprises a trough mounted below said rear edge portion to catch said seed dropping over said rear edge portion from said top surface.

4. The invention according to claim 3 in which said trough comprises a discharge end, and said trough declines from said rear edge portion of said top surface toward said discharge end, and receptacle means mounted below said discharge end for receiving seed gravitating down said declining trough.

5. The invention according to claim 4 in which said trough is elongated and extends transversely of said tray substantially in vertical alignment below said rear edge portion, said trough declining transversely toward one end of said tray.

6. The invention according to claim 5 in which said declining trough has an elevated closed end portion opposite said discharge end.

7. The invention according to claim 6 further comprising a chute having an open discharge end and an opposite hinged end portion, means pivotally connecting said hinged end portion to said discharge end of said trough to permit said chute to swing between an operative position declining from the discharge end of said trough to said discharge end of said chute, and an inoperative position in which said discharge end of said chute is above said discharge end of said trough.

8. The invention according to claim 7 in which said receptacle means is mounted beneath the discharge end of said chute in said operative position.

9. The invention according to claim 4 further comprising a cutter frame upon which the blade device is mounted, said support means mounting said tray being attached to said cutter frame and further comprising mounting means for said receptacle means being connected to said cutter frame to permit pivotal movement of said tray, said trough and said receptacle means with the movement of said cutter frame.

10. The invention according to claim 3 further comprising means attaching said transversely extending trough to said tray.

11. The invention according to claim 10 in which said trough comprises a transverse elongated declining bottom wall and a pair of opposed side walls, one of said side walls being integral with said rear transverse edge portion of said tray.

* * * * *